Aug. 22, 1950  C. G. JOHNSON  2,519,579
AUTOMATIC PHONOGRAPH
Original Filed March 21, 1940  10 Sheets—Sheet 1
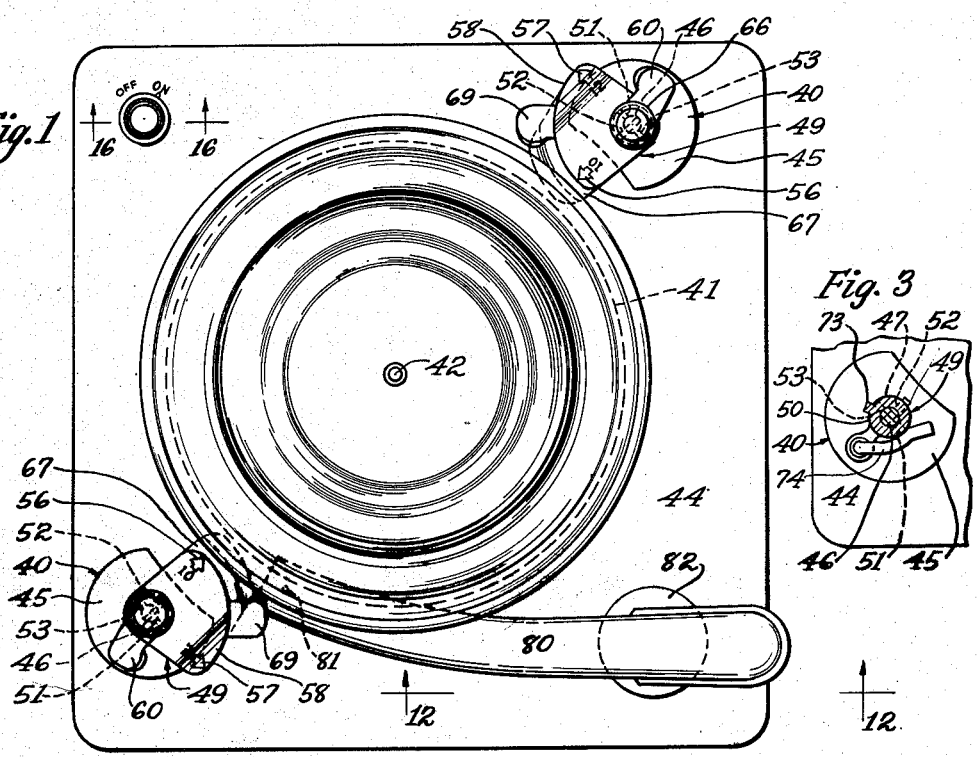
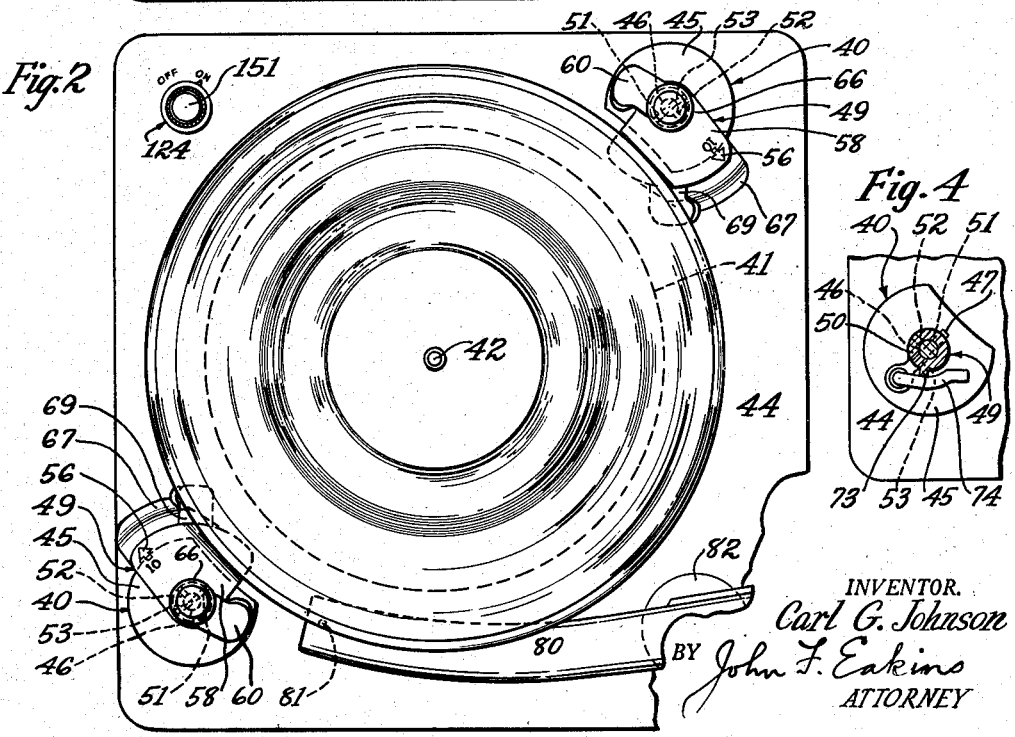
INVENTOR.
Carl G. Johnson
BY John F. Eakins
ATTORNEY

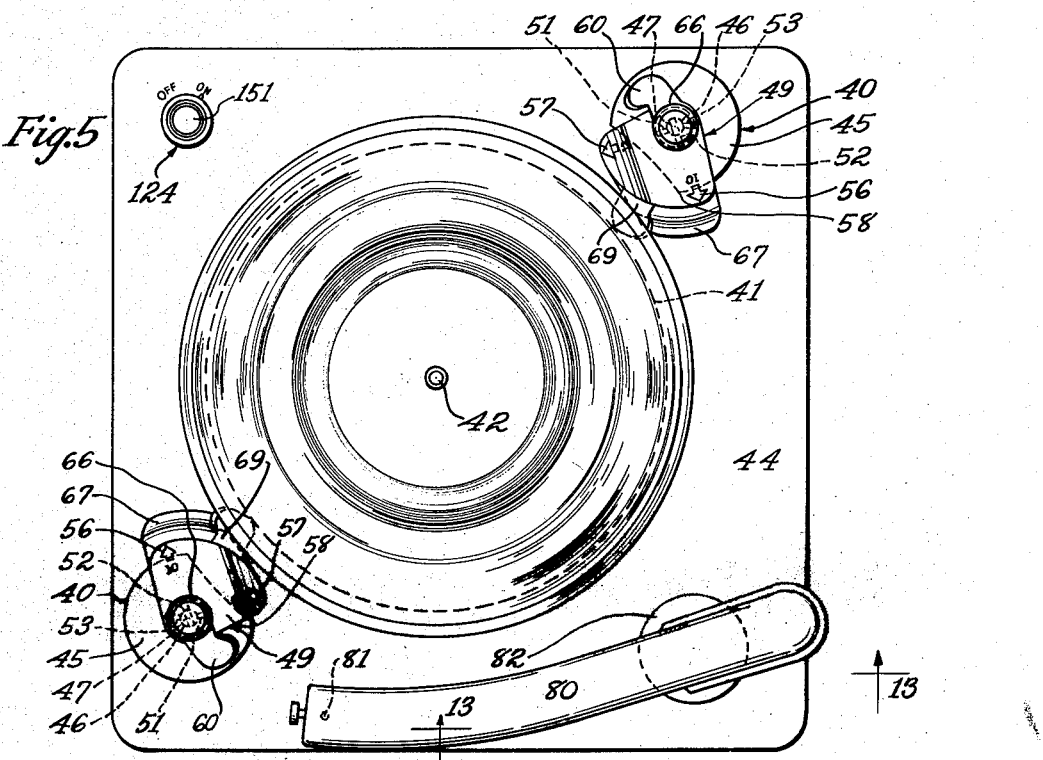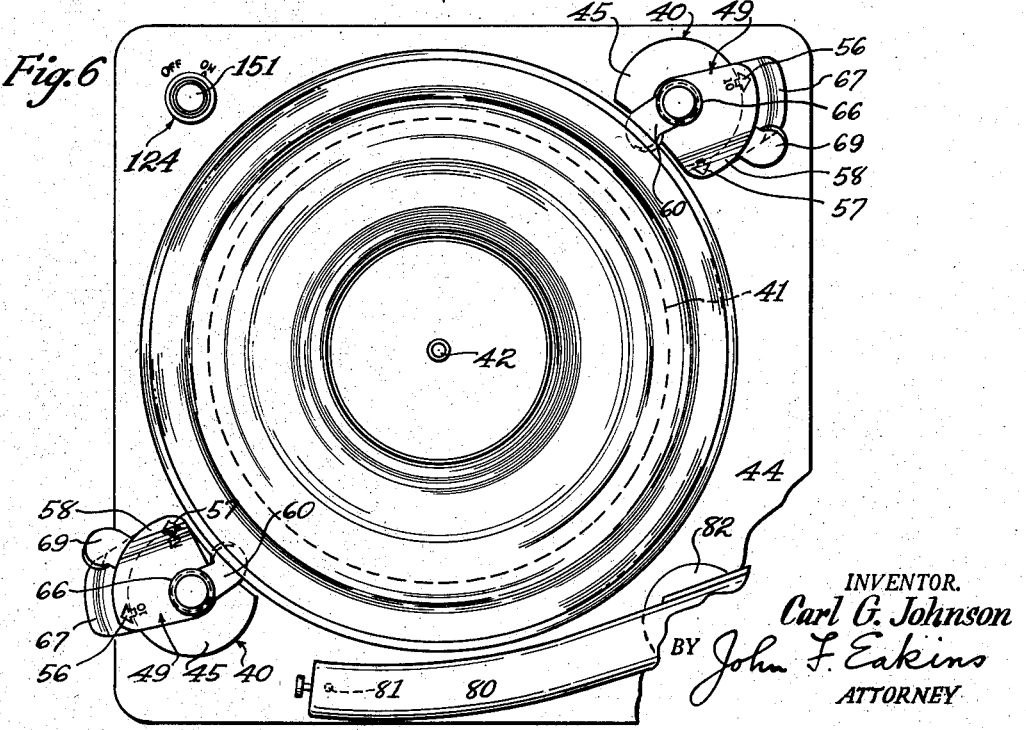

Aug. 22, 1950 C. G. JOHNSON 2,519,579
AUTOMATIC PHONOGRAPH
Original Filed March 21, 1940 10 Sheets-Sheet 3

INVENTOR.
Carl G. Johnson
BY John F. Eakins
ATTORNEY

Aug. 22, 1950     C. G. JOHNSON     2,519,579
AUTOMATIC PHONOGRAPH

Original Filed March 21, 1940     10 Sheets-Sheet 4

INVENTOR.
Carl G. Johnson
BY John F. Eakins
ATTORNEY

Aug. 22, 1950     C. G. JOHNSON     2,519,579
AUTOMATIC PHONOGRAPH
Original Filed March 21, 1940     10 Sheets-Sheet 5
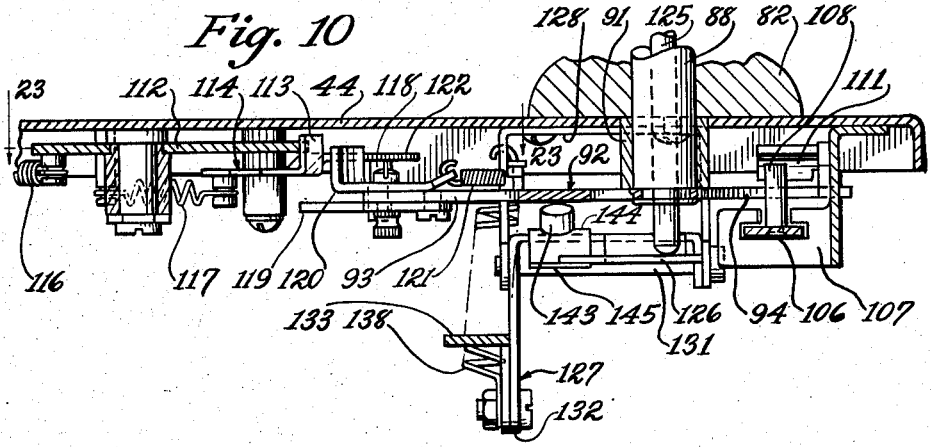
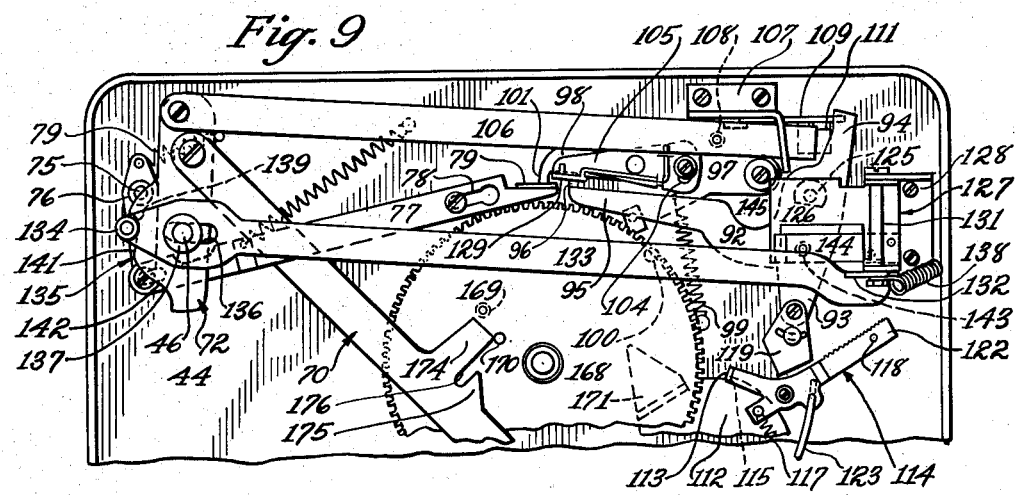
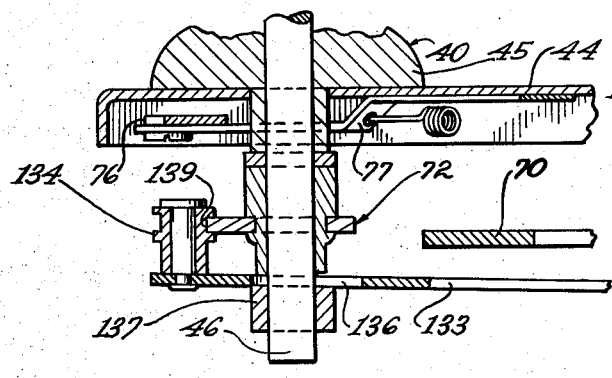
INVENTOR.
Carl G. Johnson
BY John F. Eakins
ATTORNEY

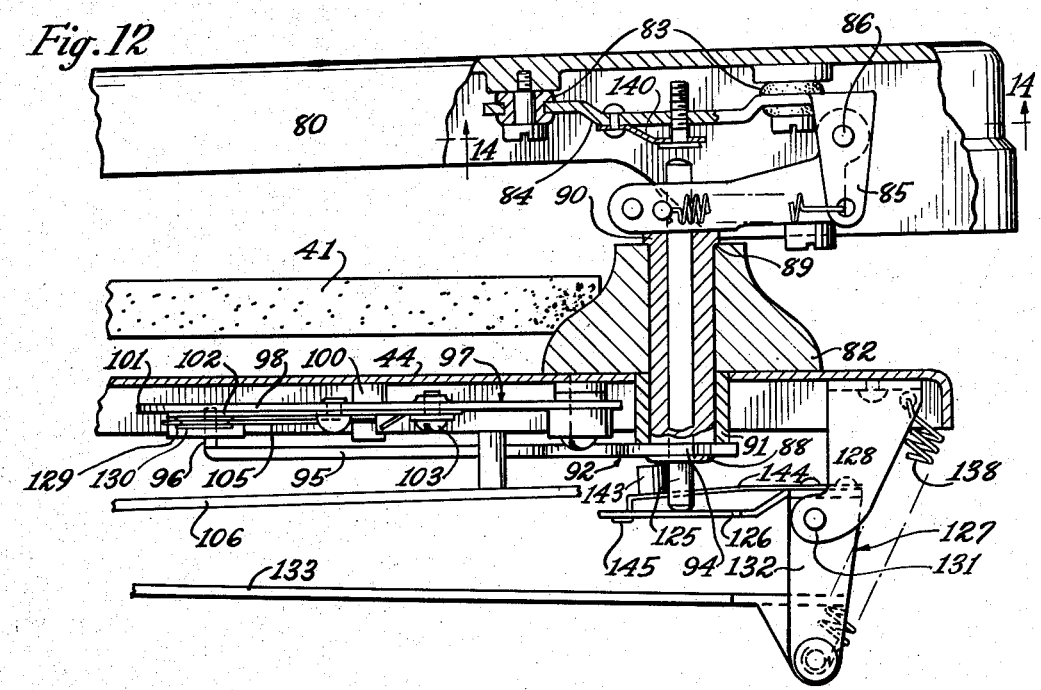

Aug. 22, 1950     C. G. JOHNSON     2,519,579
AUTOMATIC PHONOGRAPH
Original Filed March 21, 1940     10 Sheets—Sheet 7
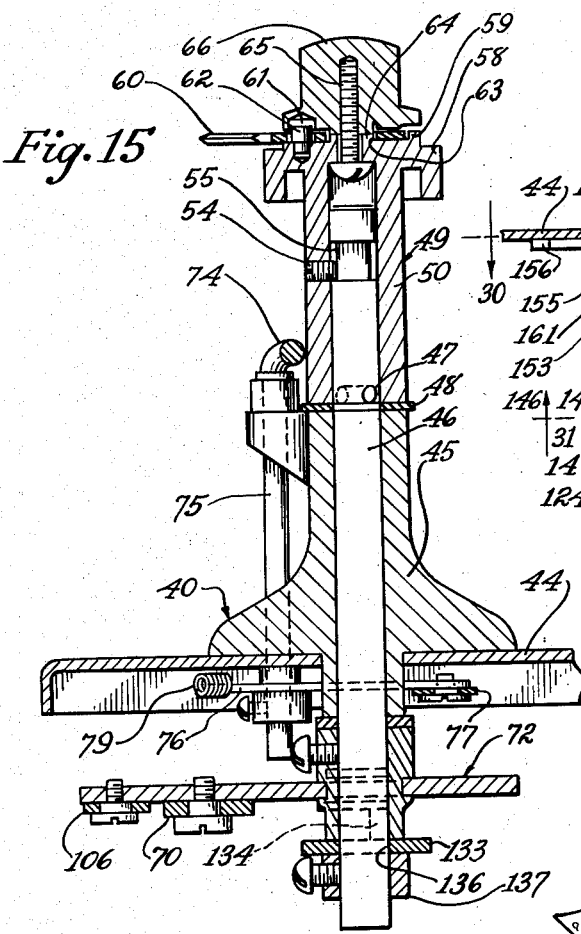
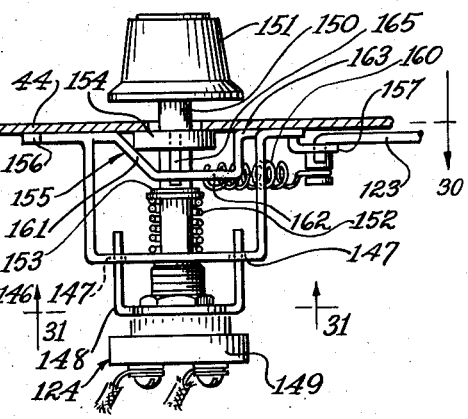
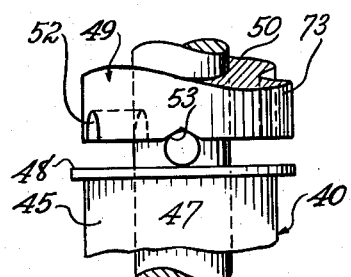
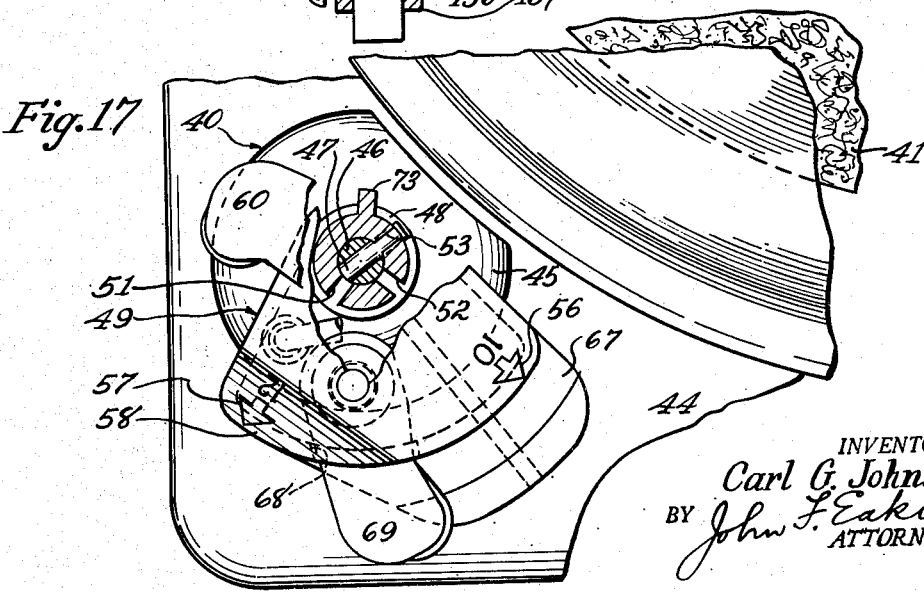
INVENTOR.
Carl G. Johnson
BY John F. Eakins
ATTORNEY

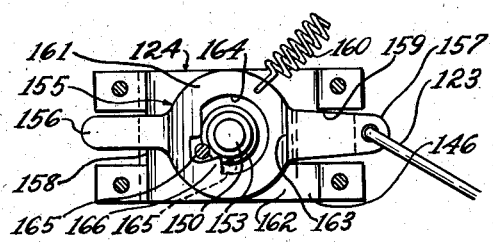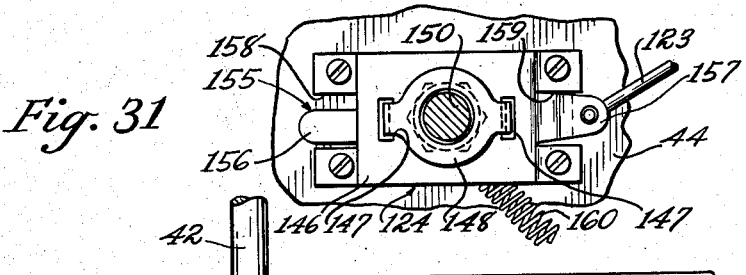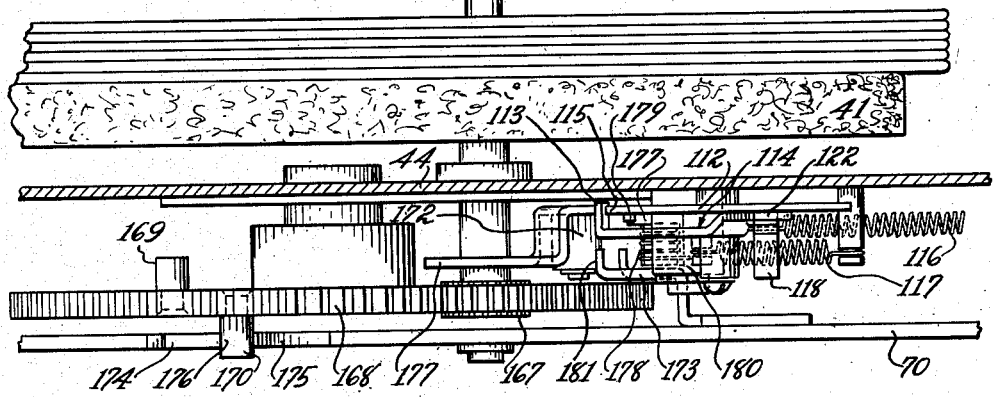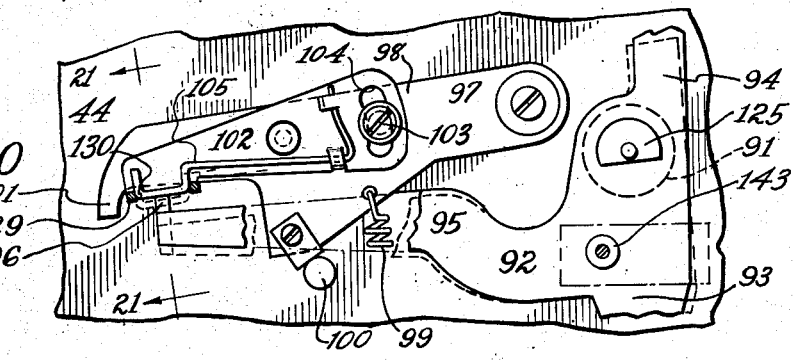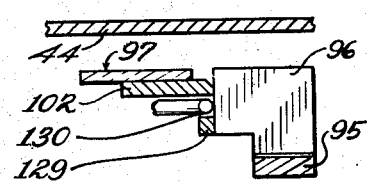

Aug. 22, 1950     C. G. JOHNSON     2,519,579
AUTOMATIC PHONOGRAPH
Original Filed March 21, 1940     10 Sheets-Sheet 9
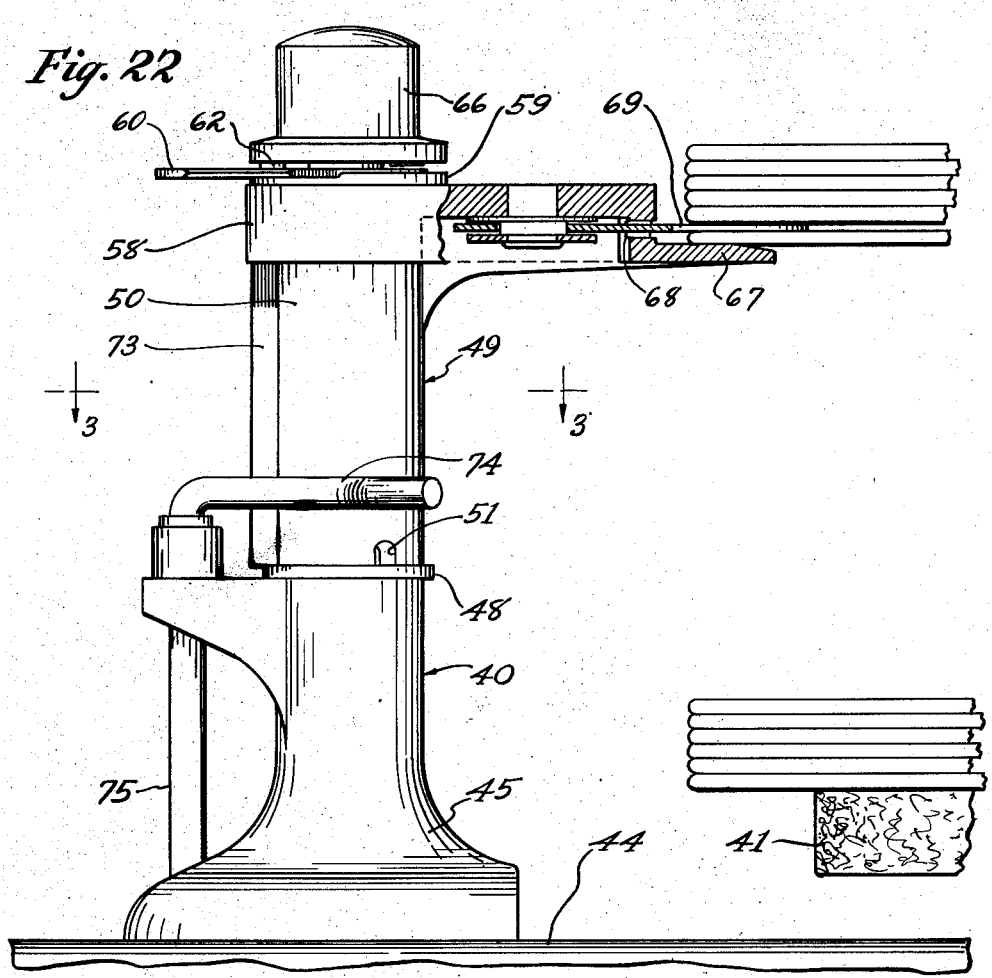
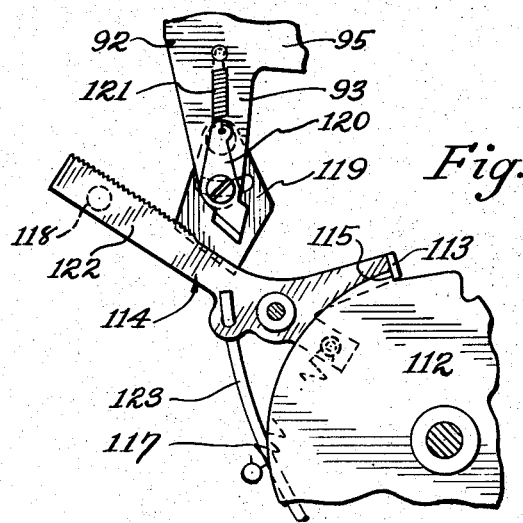
INVENTOR.
Carl G. Johnson
BY John F. Eakins
ATTORNEY

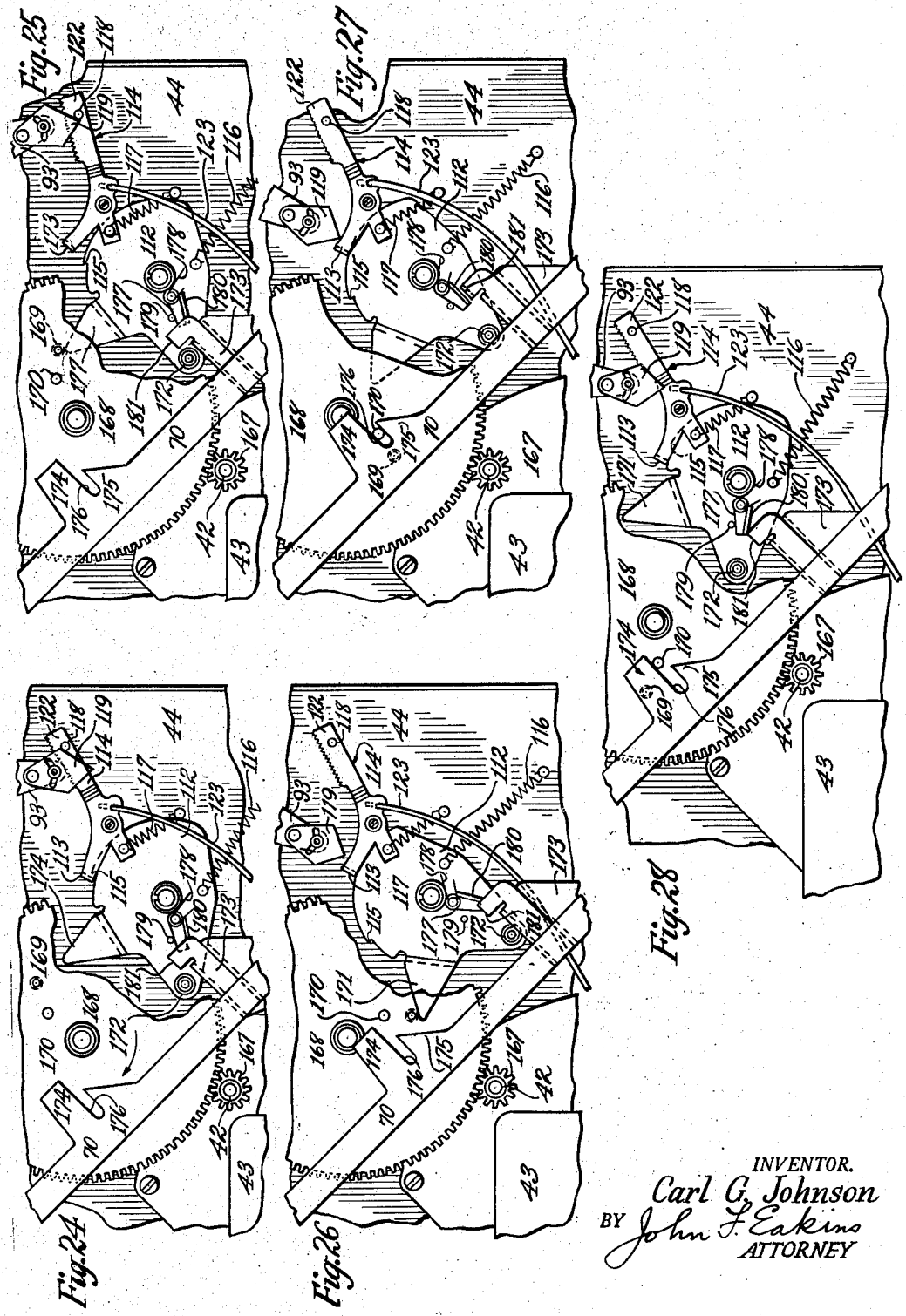

Patented Aug. 22, 1950

2,519,579

UNITED STATES PATENT OFFICE 2,519,579

AUTOMATIC PHONOGRAPH

Carl G. Johnson, Chicago, Ill., assignor to J. P. Seeburg Corporation, Chicago, Ill., a corporation of Illinois Original application March 21, 1940, Serial No. 325,111. Divided and this application June 15, 1944, Serial No. 540,395

3 Claims. (Cl. 274—10)

This application is a divisional from my co-pending application Ser. No. 325,111, filed March 21, 1940, which issued June 20, 1944, as Patent No. 2,351,972.

This invention relates to automatic phonographs and has for one of its objects the provision of a simple and effective device whereby a plurality of records may be played in sequence automatically without intervention by the operator after the records are loaded on the machine.

A further object of the invention is to provide an improved record-changing and player arm actuating mechanism.

A further object of the invention is to provide an improved record-changing mechanism in which the various record-changing and player arm actuating devices are actuated without the aid of a clutch.

A further object of the invention is to provide a simplified record-changing device which can be readily and simply adjusted to play records of different sizes.

Other objects, advantages and capabilities of the invention will appear from the following description of a preferred embodiment thereof, taken in conjunction with the accompanying drawings, in which:

Fig. 1 is a plan view of the phonograph, with its parts arranged for the playing of a 10" record;

Fig. 2 is a similar view showing the phonograph in condition for playing a 12" record;

Fig. 3 is a sectional detail view taken on the line 3—3 of Fig. 22, showing the relation of certain parts when in the condition illustrated in Fig. 1;

Fig. 4 is a similar view showing the relation of the parts when in the condition illustrated in Fig. 2;

Fig. 5 is a plan view similar to Fig. 1, showing the relation of the parts of the phonograph when a 10" record is being dropped onto the turntable;

Fig. 6 is a similar view, showing the relation of the parts of the phonograph when a 12" record is being dropped onto the turntable;

Fig. 9 is a fragmentary view similar to Figs. 7 and 8, showing the relation of certain parts when a 12" record is being played;

Fig. 10 is a fragmentary sectional view taken on the line 10—10 of Fig. 7, illustrating means for applying a braking force to the tone arm, means for rotating the tone arm beyond initial playing position and means whereby the tone arm is enabled to start the record-dropping cycle.

Fig. 11 is a fragmentary sectional view taken on the line 11—11 of Fig. 7, showing the relation of certain parts below the bottom of one of the posts;

Fig. 12 is a fragmentary section taken on the line 12—12 of Fig. 1, illustrating the tone arm and mechanism for actuating the same;

Fig. 13 is a similar view, the elements being shown in position to elevate the tone arm away from the records on the turntable;

Fig. 14 is a sectional detail of the tone arm, as viewed on the line 14—14 of Fig. 12;

Fig. 15 is a fragmentary sectional elevation taken on the line 15—15 of Fig. 7 and showing the structure of one of the posts and associated mechanism;

Fig. 16 is a fragmentary sectional view taken on the line 16—16 of Fig. 7, showing a combined switch and manual button for initiating the dropping of another record when desired;

Fig. 17 is a fragmentary plan view, showing one of the posts in record-unloading position, part of the post being broken away to show internal structure in section;

Fig. 18 is a fragmentary detail showing the relation of certain parts of one of the posts when the same is in the unloading position shown in Fig. 17;

Fig. 19 is a fragmentary sectional view taken on the irregular line 19—19 of Fig. 7, showing the relation of the turntable and elements of the device located beneath the turntable;

Fig. 20 is a detail view as viewed from beneath, illustrating the mechanism for moving the tone arm inwardly so that its needle enters the groove;

Fig. 21 is a fragmentary sectional detail taken on the line 21—21 of Fig. 20;

Fig. 22 is an elevational view showing one of the posts in elevation and illustrating the manner in which one of the upper record-supporting members enters the stack of records immediately above the lowermost record;

Fig. 23 is a fragmentary plan view taken on the line 23—23 of Fig. 10 and illustrating the trip mechanism;

Figure 7:
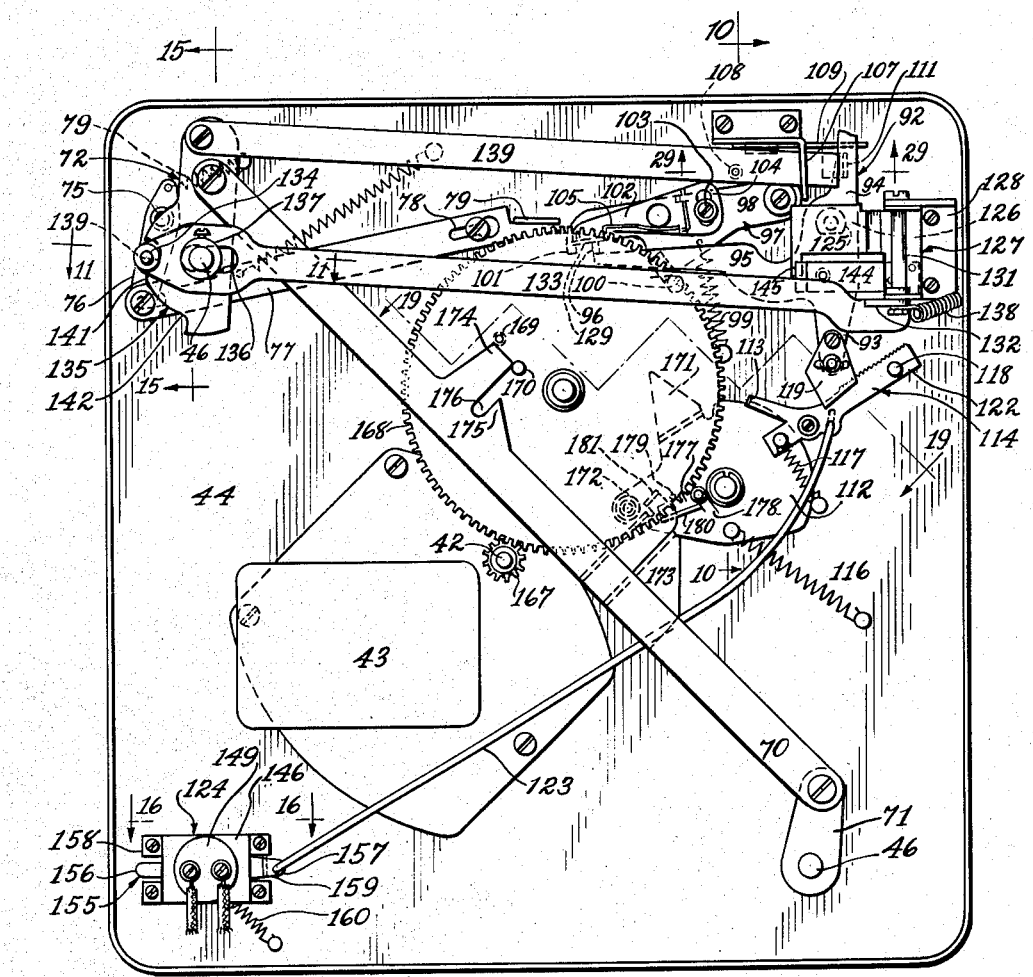
Fig. 7 is a view of the mechanism as viewed from the underside, the elements being shown in the position they occupy during the playing of a 10" record.
Figure 29:
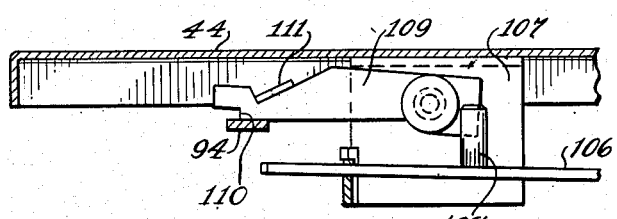

Figs. 24, 25, 26, 27, and 28 are fragmentary views similar to Fig. 7, showing successive stages of the record-changing mechanism during the record-changing cycle;

Fig. 29 is a fragmentary sectional view taken on the line 29—29 of Fig. 7, showing the tone arm latch mechanism;

Fig. 30 is a fragmentary plan view of the combined switch and cancelling member, the view being taken on the line 30—30 of Fig. 16; and Fig. 31 is an inverted sectional plan view of said member taken on the line 31—31 of Fig. 16.

Referring to the drawings, the phonograph is of the type which comprises a plurality of posts designated generally by the reference numeral 40, which are provided with means for supporting a plurality of records above a turntable 41. In the specific embodiment illustrated, two such posts are shown. During the record-changing cycle the posts 40 are oscillated, and these posts being provided with escapement devices enable the lowermost record to fall onto the turntable, the remaining records being held supported on the posts.

The turntable 41 is provided with a spindle 42 which extends upwardly a considerable distance so as to extend through the central openings in the records supported on the posts 40. The spindle 42 is driven by a motor 43 which is mounted on the underside of the motor board 44, the turntable 41 being mounted on the spindle 42 above the motor board in the usual manner.

Each post 40 comprises a pedestal 45 which is rigidly mounted on the motor board 44. A vertical shaft 46 is rotatably mounted on the pedestal, this shaft having a radial pin 47 which is adapted to rest on a washer 48 on the upper end of the pedestal 45. A supporting head 49 is supported on the upper end of the shaft 46. This supporting head comprises a sleeve 50 which receives the upper end of the shaft 46. The lower end of the sleeve 50 is provided with two notches 51 and 52 and also with a recess 53, which are adapted to cooperate with the pin 47.

The supporting head 49 is adapted for limited vertical movement with respect to the shaft 46. For this purpose the sleeve 50 is provided with a set screw 54 which extends into a circumferential groove 55 provided in the shaft 46. It will readily be seen with reference to Fig. 15 that if the supporting head 49 is raised, its lower end will clear the pin 47 so as to enable this pin to be located in either of the notches 51 or 52 or to enable it to receive the recess 53 in the manner shown in Fig. 18. It may here be explained that when the notches 51 receive the pins 47 the posts are adapted to operate with 12" records, the relation between the pin 47 and the notch 51 being shown in Fig. 4. When this relation obtains, the supporting heads are in the location shown in Fig. 2 during the playing of a 12" record and they are in the position shown in Fig. 6 when a 12" record is being dropped onto the turntable.

When the pins 47 are located in the notches 52, as shown in Fig. 3, the supporting heads are arranged to operate with 10" records. When this relation obtains, the supporting heads are in the position shown in Fig. 1 during the playing of a 10" record and in the position shown in Fig. 5 when a 10" record is being dropped onto the turntable.

When the recesses 53 are in engagement with the pins 47 as shown in Fig. 18, the supporting heads are located in the record-unloading position as shown in Fig. 17. It will readily be understood that the supporting heads may be adjusted to any of these three positions by merely raising them and rotating them so as to bring the particular notches or recesses 51, 52 or 53 into cooperative relation with the pins 47.

Suitable indicia are provided on the supporting heads to indicate the position of adjustment of the heads. Thus, as shown in Fig. 1, arrows 56 accompanied by the numeral 10, stamped into the supporting head, are directed radially inwardly when the heads are adjusted for playing 10" records, the heads being in normal or record-reproducing position. When the heads are in normal playing position for 12" records, as shown in Fig. 2, arrows 57 (best shown in Figs. 1 and 17) are directed radially inwardly. These arrows, together with the numbers 12, are stamped or otherwise formed on the supporting heads.

The supporting head may suitably comprise a major portion 58 of substantially quadrant shape. This quadrant portion serves as a normal support for 12" records, as is shown in Fig. 2. Above this quadrant portion the supporting head is provided with a boss 59 which is conformed to serve as a seat for a blade 60. The blade 60 is provided with an opening 61 which receives a small pin 62 eccentrically located on the boss 59. It also is provided with an opening 63 in alignment with the axis of the shaft 46.

The opening 63 receives a small boss 64 which is a small upwardly projecting portion of the boss 59. Through this small boss extends a screw 65 which secures upon the boss 59 a knob 66 which has a small central boss adapted to bear upon the small boss 64, so as to define the location of the knob 66 with respect to height. The knob 66 is provided with a recess which receives the pin 62. The relation between the knob and the boss 59 is such that the blade 60 is provided with a certain predetermined degree of freedom of movement in the vertical direction. The blade 60 is located above the effective portion of the quadrant 58 by an amount which is substantially equal to the thickness of a 12" record. In case of any variation in thickness of the records employed, the blade 60, owing to its limited freedom of movement, is enabled to enter between the lowermost record of the stack supported by the quadrant portion 58.

In initial position, the stack of records is supported by the quadrants 58, as shown in Fig. 2. When the supporting heads are rotated in counter-clockwise direction as viewed in Fig. 2, the quadrants 58 are withdrawn from the records. Before this withdrawal occurs the blades 60 have entered into the stack of records between the lowermost record and the record immediately above it, as shown in Fig. 6. Consequently, the lowermost record falls down along the spindle 42 onto the turntable and the remaining records are supported by the two blades 60. When the supporting heads are rotated in clockwise direction as viewed in Figs. 2 and 6 back to their position shown in Fig. 2, the quadrant portions 58 move below the elevated records and thereafter the blades 60 are withdrawn from the supported records. Consequently these supported records move downwardly one space and rest upon the quadrant portions 58 in the manner shown in Fig. 2.

The quadrant portion 58 of the supporting head is provided with a projecting flange 67 which is preferably located substantially below the level of the upper surface of the quadrant portion 58. The periphery of the quadrant portion 58 is provided with an opening 68 which enables a blade 69 to pass inwardly into the underside of the quadrant portion 58. This blade is riveted to the underside of the quadrant portion 58 so that it is provided with a certain degree of freedom for movement in a vertical direction. That is, it is not tightly riveted to the underside of the quadrant 58, but is secured thereto by means of spacer means and a washer, sufficient clearance being provided between the washer and the underside of the quadrant 58 to permit the blade 69 to move slightly up and down so that it may accommodate itself to records of varying thicknesses.

When the supporting heads are set to cooperate with 10" records, these 10" records are in the playing condition of the machine, supported on the flanges 67. When these supporting heads are moved in counter-clockwise direction as viewed in Fig. 1, the flanges 67 are withdrawn from the records. Before that withdrawal, the blades 69 enter the stack between the lowermost record of the stack and the record immediately above it. Consequently, the lowermost record is released and the remaining records of the stack are held supported by the blades 69, as shown in Fig. 5. When the supporting heads are moved in clockwise direction as viewed in Figs. 5 and 1, so as to return them to their position shown in Fig. 1, the flanges 67 move below the elevated records and thereafter the blades 69 move clear of these records so that they descend one step onto the flanges 67.

These supporting heads 49 are oscillated in counter-clockwise and clockwise directions by means of an actuating lever 70 located on the underside of the motor board 44. This actuating lever is connected to a crank arm 71 which is rigidly mounted on the lower end of one of the shafts 46. The other end of this lever is connected to a member 72 which is likewise rigidly mounted on the lower end of the other shaft 46. As far as actuation of the supporting heads is concerned, the members 71 and 72 are similar in effect. Since, however, the member 72 has other functions, it is distinguished from the member 71 by the employment of a different reference numeral.

The description so far applies equally well to both posts. Certain other mechanism is associated with the post 40 which is located at the lower left-hand side of Figs. 1, 2, 5 and 6 and on the upper left-hand side on Figs. 7 and 8; this being the post whose shaft 46 carries the member 72. In this post, which will be referred to as the control post, the sleeve 50 is provided with an exterior rib or projection 73 (Figs. 3 and 4) which is adapted to cooperate with the horizontally turned end 74 of a rod 75 (Figs. 15 and 22).

The rod 75 is rotatably mounted in the pedestal 45. Its lower end, which is located below the motor board 44, carries an arm 76 which is pivotally connected to a bar 77. The bar 77 is slidably mounted on the underside of the motor board 44 by means of a screw and slot connection 78. The bar 77 is provided with a vertical end plate 79 which is adapted to serve as an abutment for a purpose which will hereinafter be described.

The rod 75 is biased by a spring 79' which tends to force its radial portion 74 towards the sleeve 50. It may here be noted that when the associated supporting head 49 is located for the playing of a 10" record, the projection 73 is out of contact with the member 74, as shown in Fig. 3. Further it is to be noted that when the head oscillates from its position in Fig. 1 to its position in Fig. 5 for the dropping of a 10" record, the rib or projection 73 does not come into contact with the member 74. Consequently, during the playing and changing of 10" records the bar 77 remains in the position in which Fig. 7 shows it. When, however, the heads 49 are adjusted to 12" record playing position, the rib or projection 73 deflects the member 74 in the manner shown in Fig. 4 and this deflection is maintained when the heads move from their position in Fig. 2 to their position in Fig. 6 and during their return to their position of Fig. 2. Consequently, when 12" records are being played the bar 77 remains in the position in which Fig. 9 shows it.

The tone arm 80, which includes a conventional pick-up (not shown) and a needle 81 is mounted on a pedestal 82 carried on the motor board 44 in a suitable position. The tone arm is secured by means of rubber washers 83 and screws to a bracket 84 provided with ears 85 which extend downwardly (Fig. 12). The bracket 84 is connected by means of a pivot 86 to one end of a bracket 87. The bracket 87 is secured to the upper end of a tubular member 88 which is rotatably mounted in the pedestal 82 so as to provide a vertical axis for the translation of the tone arm over the record surface. The pivot 86 provides a pivotal axis whereby the tone arm may be moved up and down with respect to the record on the turntable.

Springs 89 connected to the bracket 87 and to the ears 85 serve to counter-balance the tone arm to some extent so that it applies the requisite pressure upon the needle 81. The tubular member 88 is provided with an enlarged portion 90 at its upper end, whereby it is supported by the pedestal 82. The lower end of the tubular member 88 extends through a bearing 91 on the underside of the motor board 44. Below the bearing 91 the tubular member 88 has rigidly secured thereon a member 92 which has three outwardly projecting arms 93, 94 and 95.

The arm 95 is provided with an upturned end 96 which is adapted to cooperate with a tone arm return assembly 97 (Figs. 20 and 21), this assembly serving to return the tone arm from an extreme outward position to initial playing position for records of different sizes. The tone arm return assembly comprises an arm 98 pivotally mounted on the underside of the motor board 44 and biased by a spring 99 against a stationary abutment 100. The arm 98 has an end member 101 which is adapted to cooperate with the abutment 79 on the bar 77 which has previously been described. When the bar 77 is is in the position shown in Fig. 7, the arm 98 engages abutment 100 so that the tone arm is returned to initial playing position for a 10" record. When, however, the bar 77 is in the position shown in Fig. 9, the abutment 101 of the lever 98 engages the abutment 79 on the bar 77 and the tone arm is returned only to initial playing position for a 12" record.

The arm 98 has pivotally mounted on its underside a plate 102 which may be secured to the arm 98 in desired position of adjustment by means of a bolt 103 which is threaded into the arm 98 and extends through a slot 104 in the plate 102 (Fig. 20). The plate 102 has a downturned flange 129 which is adapted to engage the upturned end 96 of the arm 95 in the manner shown in Fig. 21. The flange 129 is provided with an opening 130 through which extends a portion of a spring 105 mounted on the underside of the plate 102. This spring is relatively weak so that when the tone arm return assembly 97 is moved in counter-clockwise direction, as viewed in Fig. 20, to move the tone arm to initial playing position, the upturned end 96 is engaged by the flange 129, the spring 105 being forced inwardly from its position shown in dotted lines in Fig. 20 into its full line position in that figure. This compression of the spring 105 results from the fact that during the movement of the tone arm to initial playing position a braking effect is applied to the member 92.

As will hereinafter be described, when the tone arm is returned to initial playing position, the braking effect is withdrawn and the spring 105 is then free to move the tone arm inwardly with a slight pressure so as to move the needle into the first groove of the record. It will readily be understood that owing to the adjustable mounting of the plate 102 upon the arm 98, the return of the tone arm to initial playing position may be accurately adjusted.

Means are provided to cooperate with the arm 94 to move the tone arm outwardly clear of the records so that a record may drop from the elevated stack onto the turntable or onto records on the turntable. For this purpose is provided a bar 106, one end of which is pivotally mounted on the member 72, the other end being guided for slidable movement in a bracket 107 mounted on the underside of the motor board 44.

As best seen in Fig. 10, the bar 106 is located below the level of the arm 94 and it carries an upstanding pin 108 which is adapted to engage the arm 94 to swing the tone arm outwardly. The pin 108 is normally located a substantial distance away from the arm 94, as best seen in Figs. 7 and 9. Consequently, when the bar 106 begins to move from its position in Fig. 7 into its position in Fig. 8 as a result of the actuation of the member 72, the arm 94 is not operated until the latter part of this movement. As will hereinafter appear, during the initial part of this movement the tone arm is elevated so that the outward movement resulting from the cooperation of the pin 108 with the arm 94 swings the tone arm when it is elevated away from the record.

When records are to be unloaded from the turntable and mounted on the posts 40 for sequential playing, it is desirable that the tone arm shall be latched in an outward position clear of the records. For this purpose I pivotally mount upon the bracket 107 a latch 109 (Fig. 29) which is provided with a detent 110 which is adapted to engage the arm 94 when the tone arm is swung outwardly into its extreme position by hand. When the tone arm is swung into its extreme outward position by the pin 108, the latch 109 is held elevated by the engagement of an overhanging lateral projection 111 on the latch 109 by the pin 108. Consequently, the latch 109 is only effective when the tone arm is moved outwardly manually.

It will be noted that when the pin 108 moves to the right, as viewed in Fig. 29, during the automatic operation of the machine, the spring 99 acting upon the arm 98 causes the member 92 and its arm 94 to rotate in the counter-clockwise direction as viewed in Fig. 7. Then, when the pin 108 moves to the right as viewed in Fig. 29, the arm 94 follows it into a position clear of operative engagement with the detent 110, the pin 108 holding the latch 109 elevated until the advancing edge of the arm 94 passes beneath the detent 110. As will hereinafter appear, when the tone arm is moved outwardly by hand to its extreme position and is latched out in the position, the pin 108, when the machine is put into operation, effects the unlatching of the tone arm.

The arm 93 of the member 92 controls the unlatching of the mechanism whereby the lowermost record of the stack is dropped onto the turntable and whereby the necessary movements of the tone arm are effected. This mechanism includes a member 112 which will hereinafter be fully described. For the present purpose it is pointed out that during the playing of records the member 112 is in the position in which it is shown in Figs. 7, 23 and 24. The member 112 is held in this position by the engagement of a projection 113 on a trip lever 114 with a stop or detent 115 on the member 112.

The member 112 is biased towards its position in Fig. 27 by means of a spring 116. The trip lever 114 is biased in the counter-clockwise direction as viewed in Fig. 7, by means of a spring 117 so that its projection 113 tends to move towards the periphery of the member 112. The trip lever 114 is provided with a pin 118 which projects into the path of a contact member 119 adjustably mounted on the arm 93. As the tone arm moves inwardly of the record during the playing, the arm 93 and the contact member 119 move continuously towards the pin 118 and eventually, when the tone arm reaches a definite inward position on the record, the contact member 119 engages the pin 118 and swings the latch member 114 in clockwise direction as viewed in Fig. 7, so as to unlatch the member 112 and permit it to move in the counter-clockwise direction to some extent under the influence of the spring 116.

On its upper side (Fig. 23) the arm 93 has pivotally mounted thereon a dog 120 which is biased to normal position by means of a spring 121. When the arm 93 moves in clockwise direction as viewed in Fig. 23, the point of the dog 120 slips along the serrated edge of a member 122 carried by the trip lever 114. In the event of reverse movement, that is, counter-clockwise movement of the arm 93, the point of the dog being held by engagement with the serrated edge of the member 122 forcibly moves the trip lever 114 in counter-clockwise direction and the member 112 is unlatched. Consequently, the trip will operate when the tone arm is moved into a definite position on the record and it will operate when the needle runs into an inner eccentric groove of the type provided in certain records. The trip lever 114 may also be moved to unlatch the member 112 by manual means. For this purpose a rod 123 is connected to the lever 114 as shown in Fig. 7, and when this lever is moved longitudinally downwardly and to the left as viewed in this figure, the trip lever will be rotated to unlatch the member 112. The rod 123 is connected to a combined switch and cancelling assembly 124, which will hereinafter be described in detail.

The means whereby the tone arm is elevated away from the records will now be described.

A pin 125 is slidably mounted within the tubular member 88. The lower end of this pin rests upon the normally horizontal arm 126 of a bell crank lever 127 which is pivotally mounted on a bracket 128 (Fig. 12), by a pin 131 (Figs. 10 and 12). The bell crank lever 127 comprises a downwardly extending arm 132 to which one end of a bar 133 is pivotally connected. The other end of the bar 133 carries a cam roller 134 which is adapted to engage a cam surface 135 on the member 72.

Adjacent the cam roller 134 the bar 133 is provided with a slot 136 through which extends the shaft 46 of the control post with which the member 72 is associated. This end of the bar is supported by means of a collar 137 (Fig. 11) mounted on this shaft 46. The bar 133 is biased towards the right, as viewed in Figs 7, 8 and 12, and the cam roller 134 is biased towards the cam 135 by means of a spring 138 which extends from the lower end of the arm 132 of the bell crank lever 127 to a suitable position on the motor board 44.

When the machine is playing a record the cam roller 134 is located at a low point 139 of the cam surface 135 and the spring 138 holds the arm 126 in its lowest position as is shown in Fig. 12. In this relation of the parts the pin 125 is below the contact member 140 which is adjustably mounted on the bracket 84 of the tone arm 80. Consequently, the tone arm is free to move to a low position with its needle engaging the record on the turntable 41. When the member 72 moves in the clockwise direction as viewed in Fig. 7, the roller 134 rides up upon a rise 141 on the cam surface 135, moving the bar 133 to the left as viewed in Fig. 7, and elevating the arm 126 of the bell crank lever 127 from its position in Fig. 12 to its position in Fig. 13. As a result of the upward movement of the arm 126, the rod 125 engages the contact member 140 and moves the tone arm 80 upwardly into its position in Fig. 13. In a position of the element shown in Fig. 13, the needle is clear of all the records which may be on the turntable.

Figure 8:
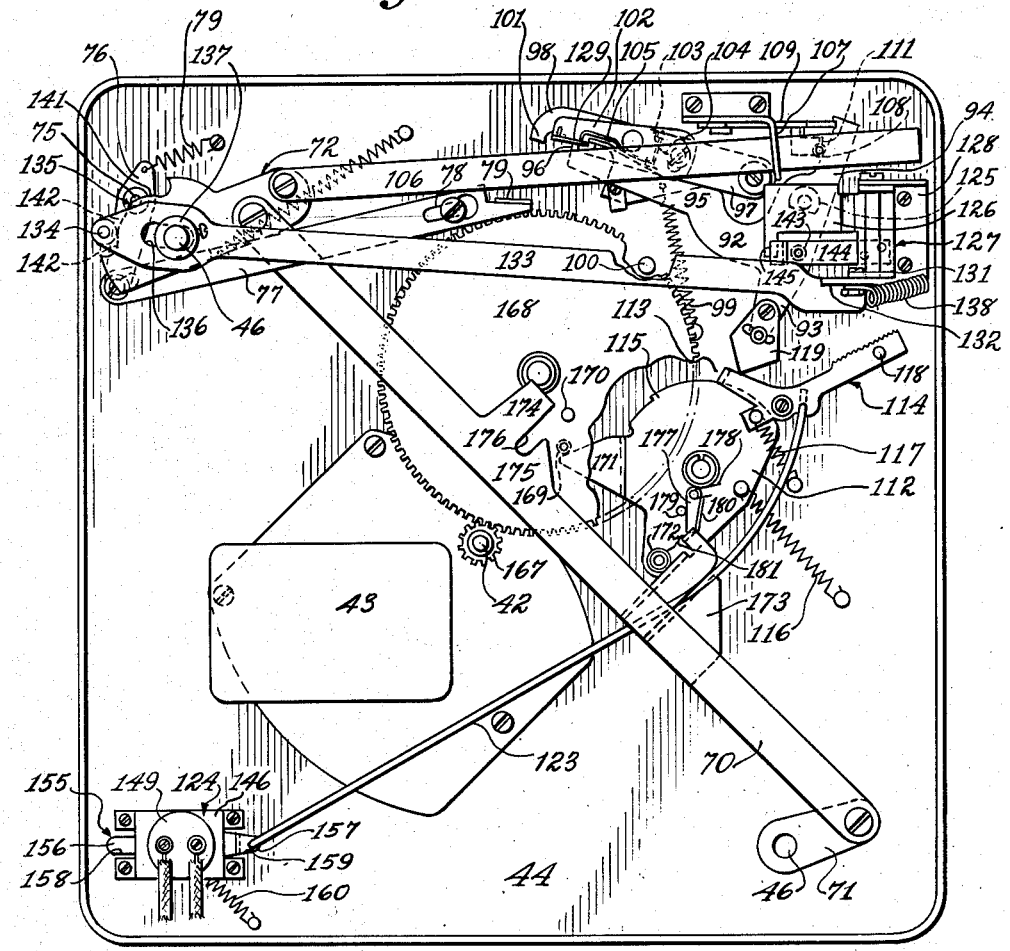
Fig. 8 is a similar view, showing the relation of the parts when a 10" record is being dropped onto the turntable.

It is to be noted that the elevating movement of the tone arm which results from the cooperation of the cam rise 141 with the roller 134 is effected before the pin 108 engages the arm 94. After the pin 108 engages this arm 94, the cam roller 134 rides over a cam rest 142 on the cam surface 135 so that the bar 133 remains stationary and the tone arm remains elevated while the pin 108 is throwing the tone arm out laterally clear of the records. The relation of these elements at that time is shown in Fig. 8. When the member 72 begins to return from its position shown in Fig. 8 into its position shown in Fig. 7, the cam roller 134, riding over the cam dwell 142, the tone arm remains elevated. As the bar 106 carries the pin 108 away from the arm 94, the spring 99 moves the member 92 in the counter-clockwise direction as viewed in Figs. 7 and 8, until the arm 97 engages the abutment 100 or the abutment 79, depending upon whether or not the posts are set for 10" or 12" records. After the movement of the arm 97 has been thus arrested, the cam roller 134 moves down the cam rise 141 and the tone arm is permitted to descend onto the record in initial playing position.

As has been previously indicated, means are provided for applying a braking effect upon the tone arm assembly when the tone arm is elevated. This braking means may suitably comprise a friction member 143 which may be of rubber or suitable fibrous or friction material. The friction member 143 is preferably resiliently mounted on the arm 126. For example, as shown in Fig. 12, it may be mounted on a flat spring 144 which is anchored to the bell crank lever 127 adjacent its pivot.

The leaf spring 144 may suitably be connected by a detent portion 145 to the arm 126 so that the friction member 143 is positively withdrawn out of contact with the member 92. When the arm 126 is elevated, as shown in Fig. 13, the leaf spring 144 is free of the arm 126 so that it applies a resilient pressure upon the member 92 when the tone arm is raised. Consequently, when the tone arm is swung out laterally clear of the records and when it is returned to initial playing position, this brake maintains the tone arm in the position into which it is swung without any tendency to move away from that position. It will be understood that when the arm 126 is lowered into the position in which it is shown in Fig. 12, and the friction member 143 is withdrawn from the member 92, the weak spring 105 mounted on the member 102 is able to move from its full line position in Fig. 20 into its dotted line position in that figure, thus moving the tone arm gently towards the first groove of the record.

The combined switch and cancelling assembly 124 comprises a bracket 146 (Fig. 16) mounted on the underside of the motor board 44. This bracket may suitably be of stirrup formation. The horizontal lower portion of the bracket is provided with two slots 147 which receive and guide the upwardly directed arms of a U-shaped member 148. This U-shaped member is rigidly secured to a switch unit 149 which comprises a spindle 150 which projects upwardly through openings in the bracket 146 and in the motor board 44. Its upper end carries a button 151 whereby the switch may be turned on and off by slight turning movement in one direction or the other, as indicated in Fig. 1.

The button, switch and U-shaped member 148 are biased upwardly by means of a coil spring 152 arranged around the spindle 150 and bearing against the horizontal portion of the U-shaped member 146 and against a suitable collar 153 rigidly carried by the spindle 150. The upward movement of the switch 149, button 151 and associated parts is limited by a collar 154 rigidly secured to the spindle 150 and adapted normally to bear against the underside of the motor board 44. It will thus be seen that the switch 149 may be turned on and off by slight turning movements of the button 151 and that the switch assembly, including the spindle 150, may be moved downwardly to a limited extent by merely pressing the button 151 inwardly. When the button 151 is released, the spring 152 forces the assembly up to its normal position. It will, of course, be understood that the switch 149 controls the supply of current to the motor 43.

The combined switch and cancelling assembly 124 comprises a cam member 155 (Figs. 16 and 30). This member comprises two horizontal end portions 156 and 157 which are guided in slots 158 and 159, respectively, provided in the bracket 146. The end portion 157, to which is connected the rod 123 previously referred to, has a relatively close fit within its slot 159. The other end member 156 has a considerable degree of freedom within its slot, but is normally held to one side thereof, as shown in Fig. 30, by means of a spring 160.

Between the terminal portions 156 and 157 the cam member 155 comprises a generally depressed intermediate portion which includes an inclined cam portion 161 adjacent the terminal portion 156 and a main horizontal body portion 162 which is connected to the cam portion 161 and to a generally vertical portion 163 which is contiguous to the terminal portion 157. The inclined cam portion 161 is normally in contact with the collar 154 on the spindle 150. Consequently, when the button 151 is depressed, the collar 154 causes movement of the cam member 155 to the left as viewed in Fig. 16, and consequently the rod 123 is pulled to the left as viewed in this figure, and pulled downardly and to the left as viewed in Figs. 7 and 8. Thus, the downward movement of the button 151 unlatches the member 112.

In the horizontal portion 162 and in the adjacent portion of the inclined cam portion 161 the cam member 155 is provided with an opening 164 (Fig. 30) through which freely extends the spindle 150. A pin 165 (Fig. 16) projects downwardly from the collar 154 into the opening 164. The cam member 155 is provided with a detent 166 which projects into the opening 164 as shown in Fig. 30. When the switch button 151 is at the "off" position, the pin 165 is in its dotted line position in Fig. 30. When the button 151 is turned to the "on" position, the pin 165 engages the detent 166 and moves the cam member 155 to the left as viewed in Fig. 30. Thus, the rod 123 is moved to the left, as viewed in Fig. 16, each time the switch is turned on. This movement, as previously explained, results in the unlatching of the member 112. When the switch button 151 is again rotated to the "off" position, it passes the detent 166 freely owing to the freedom of movement of the terminal portion 156 in its slot 158. When the pin 165 has returned to its dotted line position in Fig. 30, the spring 160 moves the cam member 155 so as to interpose the detent 166 between the two positions of the pin 165.

The record-changing mechanism is driven from the motor 43 through a pinion 167 on the turntable spindle 42, which pinion meshes with a large gear 168 rotatably mounted on the underside of the motor board 44. The gear 168 carries an upwardly directed pin 169 and a downwardly directed pin 170. The actuating member 112 previously referred to is also pivotally mounted on the underside of the motor board 44.

The member 112 carries a downwardly displaced nose portion 171 (Fig. 19) which is located on a level to enable it to cooperate with the upwardly extending pin 169. When the member 112 is in its latched position, as shown in Fig. 7, its nose portion 171 is located out of the path of the pin 169. When, however, the latch lever 114 is actuated in any of the three ways previously described, the member 112 is swung by the spring 116 from its position in Fig. 24 into its position in Fig. 25 so that the nose portion 171 is engaged by the pin 169, as shown in Fig. 25, and the member 112 is swung by the pin 169 into its position in Fig. 26. When the pin 169 clears the nose portion 171, the member 112 is swung by its spring 116 from its position in Fig. 26 into its position in Fig. 27.

The actuating member 112 carries a roller 172 which is adapted to cooperate with an abutment member 173 which projects laterally from the bar 70. During the playing of a record the roller 172 and the abutment member 173 are in their positions shown in Fig. 24. When the actuating member 112 is swung progressively through its positions in Figs. 25 and 26, the roller 172 engages the abutment member 173 and the bar 70 is moved longitudinally from its normal position of Fig. 7 into its position in Fig. 8. Consequently, the members 71 and 72 are moved in clockwise direction, as viewed in Figs. 7 and 8, and the supporting heads 49 are moved in counter-clockwise direction as viewed in Figs. 1 and 2, with the result that these heads are rotated from their positions in Figs. 1 and 2 into their positions of Figs. 5 and 6, respectively. Thus, the lowermost record of the elevated stack is dropped when the bar 70 approaches the end of its movement towards the position in which it is shown in Fig. 8.

Before the record is dropped, the rotation of the member 72 from its position in Fig. 7 into its position in Fig. 8 causes the elevation of the tone arm in the manner previously described by actuation of the bar 133 and the displacement of the tone arm clear of the records by the displacement of the bar 106 and the pin 108 carried thereby. Only after the tone arm is elevated and displaced outwardly clear of the records does the lowermost record of the elevated stack fall onto the turntable. It is to be noted that after the record is dropped, the elevated stack is left supported upon the blades 69 or the blades 60, as shown in Figs. 5 and 6, respectively.

After the pin 169 clears the nose portion 171 of the latch member 112, as shown in Fig. 26, the pin 170 moves into engagement with an abutment 174 which projects laterally from the bar 70. Consequently, the bar 70 is moved longitudinally so as to return the members 71 and 72 from their positions of Fig. 8 into their positions of Fig. 7. Consecutive positions of the pin 170 and the abutment 174 are shown in Figs. 26, 27, 28 and 7. This movement of the bar 70 causes the supporting heads to return from their positions in Figs. 5 and 6 to their positions in Figs. 1 and 2, respectively, and it effects the consecutive withdrawal of the bar 106 to permit the tone arm to move to initial playing position, and the movement of the bar 133 to the right as viewed in Fig. 7, to permit the tone arm to drop into engagement with the record in the maner previously described. It has been noted that during the initial part of this return movement the cam roller 134 rides upon a cam rest 142 and that thereafter it rides down a cam fall 141.

In order to prevent the spring 138 from jerking the bar 70 and associated parts into their final position, I prefer to provide a tooth 175 on the bar 70 so as to provide a slot 176 between it and the abutment 174 within which slot the pin 170 is located, as shown in Fig. 27, during the major part of its actuating relation to the bar 70. When the bar 70 approaches its position shown in Fig. 7, the pin 170 moves out of the slot 176 and the unrestricted movement of the bar 70 enables the projection 174 to move completely away from the path of the pin 170.

The member 112 has pivotally mounted thereon a dog 177 which is biased by a spring 178 into engagement with a pin 179 mounted on the member 112. The dog 177 is provided with a downwardly directed flange 180 which is adapted to cooperate with an upturned projection 181 carried on the outer end of the abutment member 173. When the bar 70 is moved by the roller 172 on the member 112 through its positions shown in Figs. 24, 25, 26 and 27, the abutment 181 moving with the bar 70 moves the dog 177 away from its pin 179 and finally moves past the dog 177. When the bar 70 is moved upwardly and to the left, as viewed in Fig. 27, the abutment 181 engages the flange 180 of the dog 177 as shown in Figs. 27 and 28, and forces this dog against the pin 179 so that the member 112 is moved in clockwise direction as viewed in Figs. 27 and 28, thus enabling the latch lever 114 to engage and hold the member 112 in its latched position shown in Fig. 7.

The operation is as follows:

The tone arm 89 is moved outwardly by hand clear of the records which may be on the turntable or on the supporting heads 49. This arm is latched in that position by engagement of the arm 94 by the latch 109 as previously described. Any records on the supporting heads are removed and these supporting heads are then rotated so as to bring their recesses 53 into cooperative relation with the pins 47. When this is done the supporting heads are in the position shown in Fig. 17, and any records on the turntable may be removed. The supporting heads are then adjusted for the playing of 10" or 12" records in the manner previously described, and records of corresponding dimension are then applied upon the upper end of the spindle 42 so that their peripheral portions rest upon the supporting heads.

The movement of the supporting heads to the 12" position locates the bar 77 in its position of Fig. 9, so that it is adapted to cooperate with the abutment 101 of the arm 98. Movement of the supporting heads to the 10" position locates the abutment 79 of the bar 77 clear of the abutment 101 and enables the arm 98 to cooperate with the abutment 100. The switch button 151 is then rotated from its "off" position to its "on" position, which starts the motor and simultaneously moves the lever 114 away from the member 112 so that the nose portion 171 of this member is moved into the path of the pin 169. The pin 169 then actuates the member 112 in the manner previously described so that the supporting heads are swung into their position of Fig. 5 or Fig. 6, depending upon whether the heads were set for 10" or 12" records, respectively. The lowermost record of the elevated stack then drops onto the turntable and the pin 170 actuates the bar 70 so as to return the record-changing elements to initial position.

During the initial part of the return movement of the bar 106, the pin 108 maintains the latch 109 elevated so that during this return movement the arm 98 is moved by the spring 99 until it is brought into engagement with the abutment 79 or the abutment 100, as the case may be, thus returning the tone arm to initial playing position. After this return, the continued movement of the bar 133 causes the tone arm to descend to the record.

After the tone arm has moved downwardly to bring its needle into contact with the record on the turntable, the brake element 143 is withdrawn from the member 92 and the spring 105 is enabled to move the tone arm assembly gently so as to bring the needle into the first track groove of the record. During the return movement of the bar 70, the member 112 is latched out in the manner previously described and the record on the turntable is played until the latch lever 114 is again released by engagement of the abutment 119 with the pin 118 or by actuation of the serrated member 122 by the dog 120 in the manner previously described. When this unlatching occurs, the record-changing cycle is repeated and the next record is played. This operation continues indefinitely until the motor is stopped.

If it is desired to terminate the playing of a record before its completion, it is merely necessary to depress the button 151, which trips the lever 114 and initiates the record-changing cycle.

Although the invention has been disclosed in connection with the specific details of a preferred embodiment thereof, it must be understood that such details are not intended to be limitative of the invention except insofar as set forth in the accompanying claims.

Having thus described my invention, what I claim as new and desire to secure by Letters Patent of the United States is:

1. In an automatic phonograph having a turntable and record changing mechanism adapted to supply records seriatim to said turntable, in combination, a player arm arranged to cooperate with records on the turntable, said player arm being free for manual translational movement laterally outwardly to a position clear of the records on the turntable, a latch adapted to hold said player arm in said position, and automatic means for moving said player arm into said position comprising means for rendering said latch ineffective.

2. In an automatic phonograph having a turntable and record changing mechanism adapted to supply records seriatim to said turntable, in combination, a player arm arranged to cooperate with records on the turntable, a member connected to the player arm to move therewith during translational movement of the player arm, said player arm being free for manual translational movement laterally outwardly to a position clear of the records on the turntable, a latch adapted to engage said member to hold said player arm in said position, an automatically actuated member adapted to engage first said member to move the player arm into said position, and means on said automatically actuated member for rendering said latch inoperative when said automatically actuated member is in engagement with the first said member.

3. In an automatic phonograph having a turntable, a player arm arranged to cooperate with records on the turntable, and automatic means to move the player arm laterally outwardly to a position clear of the records on the turntable, to supply records seriatim to said turntable and to control the return of the player arm to initial playing position, in combination, a latch normally biassed to latching position and adapted to latch said player arm in said position when manually moved to said position, and means associated with said automatic means for releasing said latch.

CARL G. JOHNSON.

REFERENCES CITED

The following references are of record in the file of this patent:

UNITED STATES PATENTS

| Number | Name | Date |
|---|---|---|
| 1,349,705 | Woodward | Aug. 17, 1920 |
| 1,841,593 | Benjamin | Jan. 19, 1932 |
| 2,191,214 | Lannerd | Feb. 20, 1940 |
| 2,271,001 | Fortune | Jan. 27, 1942 |
| 2,298,447 | Wright | Oct. 13, 1942 |
| 2,333,414 | De Tar | Nov. 2, 1943 |
| 2,412,441 | Carson et al. | Dec. 10, 1946 |

FOREIGN PATENTS

| Number | Country | Date |
|---|---|---|
| 352,980 | Great Britain | July 13, 1931 |
| 406,354 | Great Britain | Feb. 26, 1934 |